United States Patent [19]

Michmerhuizen

[11] Patent Number: 6,047,237
[45] Date of Patent: Apr. 4, 2000

[54] COMPASS PRECALIBRATION METHOD

[75] Inventor: Mark Michmerhuizen, Holland, Mich.

[73] Assignee: Prince Corporation, Holland, Mich.

[21] Appl. No.: 08/987,946

[22] Filed: Dec. 10, 1997

[51] Int. Cl.[7] .............................. G05D 1/00; G01C 25/00; G01C 17/00
[52] U.S. Cl. ......................... 701/224; 701/207; 701/200; 702/85; 702/92; 702/93; 702/150; 73/1.75; 73/1.76; 33/300; 33/324; 33/355 R
[58] Field of Search ..................................... 701/224, 207, 701/200; 702/85, 92, 93, 150; 73/1.75, 1.76; 33/324, 355 R, 356

[56] References Cited

U.S. PATENT DOCUMENTS

| | | | |
|---|---|---|---|
| 4,622,843 | 11/1986 | Hormel | 73/1.76 |
| 4,677,754 | 7/1987 | Hormel | 33/361 |
| 4,807,462 | 2/1989 | Al-Attar | 73/1.76 |
| 4,843,865 | 7/1989 | Fowler | 73/1.76 |
| 5,390,122 | 2/1995 | Michaels et al. | 701/200 |
| 5,737,226 | 4/1998 | Olson et al. | 701/224 |

Primary Examiner—William A. Cuchlinski, Jr.
Assistant Examiner—Yonel Beaulieu
Attorney, Agent, or Firm—Price, Heneveld, Cooper, DeWitt & Litton

[57] ABSTRACT

A method of installing a compass system includes the steps of mounting the electronic compass in a vehicle, coupling the electronic compass to a power source of the vehicle, downloading precalibration data into the electronic compass after the electronic compass has been mounted in the vehicle, and initiating a precalibration routine in the vehicle that is headed in a predetermined direction. The method may further include the steps of identifying characteristics of the vehicle and selecting precalibration data corresponding to the identified vehicle characteristics. The precalibration data selected corresponds to a make and model of the vehicle in which the compass may be installed and further may correspond to sets of vehicle options that may affect vehicular magnetism. If the electronic compass is provided as part of a trip computer, the precalibration data is preferably downloaded at the same time that the fuel tank size is downloaded into the trip computer.

20 Claims, 3 Drawing Sheets

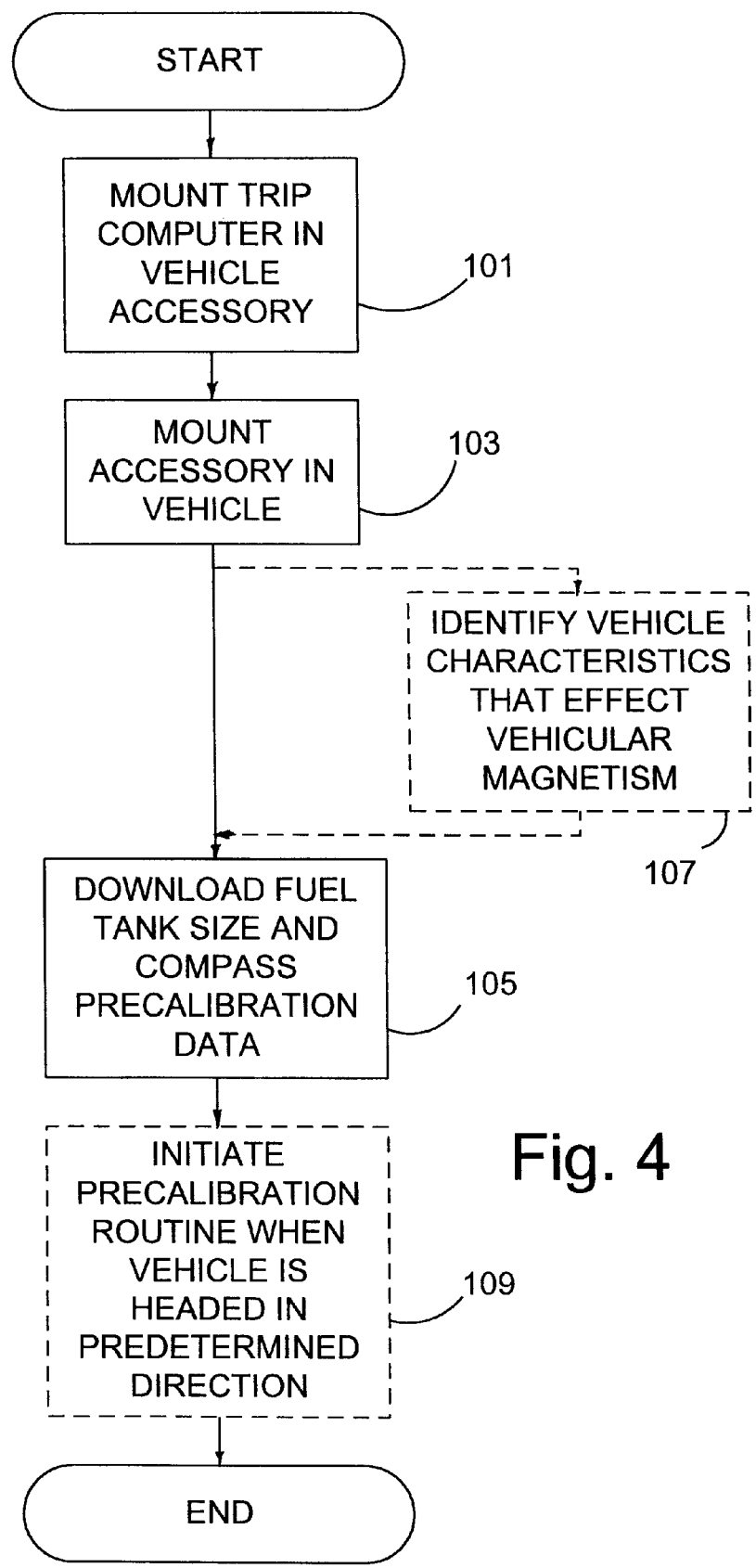

COMPASS PRECALIBRATION METHOD

BACKGROUND OF THE INVENTION

The present invention relates to magnetic direction sensing systems and particularly those for use in vehicles.

Microprocessor-controlled compass systems utilizing magnetic field sensors are known for implementation in a vehicle. Such systems sense the magnitude of the earth's magnetic field using two channels of measurement. The sensor data, if plotted on an X-Y coordinate plane, would be as shown in FIG. 1. For a properly calibrated compass, the plot of sensor data creates a perfect circle centered around the origin of the coordinate plane when the vehicle travels in a 360° loop, as indicated by Graph A of FIG. 1. The radius of the circle represents the detected earth's magnetic field strength, and the vehicle's compass heading at a particular time during travel is represented by a point on the circle. By calculating the angle which the point forms with the X-Y coordinate plane, the compass heading of the vehicle may be determined.

The earth's magnetic field as sensed by the magnetic field sensors on the vehicle, however, is affected by vehicle magnetism. Vehicular magnetism is partially dependent upon the relative locations and densities of ferrous materials within the vehicle, as well as the presence of electrical accessories that may themselves generate a magnetic field such as motors, or even a roof-mounted magnetic cellular telephone antenna. Further, the manner in which a vehicle responds to changes in magnetic fields also depends upon vehicular magnetism. Vehicular magnetism will cause the magnetic field sensed by the compass channels when the vehicle is heading in a given direction to be either greater or lesser than that expected for a vehicle with no magnetic interference. As a result, the plot of sensor data will be shifted away from the origin of the coordinate plane in some direction, resulting in a pattern such as the circle shown in Graph B of FIG. 1 when the vehicle travels a 360° loop. The magnitude of a shift of sensor data from the origin is proportional to the magnitude of the affect of vehicular magnetism on the readings of the sensors. Although Graph B is shown in FIG. 1 as a circle having the same radius as circle A, it should be noted that vehicular magnetism as well as local environmental magnetism may effect the strength of the magnetic field thereby altering the radius of the circle. Further, the sensed magnetic field strengths that the compass senses in any two directions may be affected to different degrees by such vehicular and environmental magnetism. Thus, Graph B may take the form of an ellipse or other non-circular pattern.

Electronic compass systems may be calibrated to compensate for vehicular magnetism. Such calibration may be performed by detecting the center of an obtained circular plot of data B and subsequently computing the difference in the X and Y coordinates between the center of that circle and the origin of the X-Y axis. The difference in X and Y values may then be used to offset the detected sensor levels prior to computing a heading. Alternatively, a compensation signal may be applied directly to the sensors such that the output of the sensors is that of a properly calibrated system.

Although electronic compass systems are known which automatically and continuously calibrate the compass system after it has been installed in a vehicle, some automatic calibration routines require that the vehicle be driven in at least three 360° loops to ensure accurate compensation. However, because space and time constraints at an assembly plant typically do not permit vehicles to be driven in this many loops, newly-manufactured vehicles having such compass systems, are typically transported to dealerships before the automatic calibration routine is able to properly calibrate the compass. If these vehicles are not subsequently driven in a sufficient number of loops to calibrate the compass prior to delivery to the buyer, the buyer may be led to believe that the compass system is defective. Due to a large number of warranty claims arising under these circumstances, some automobile manufacturers have now required that suppliers of compass systems ensure that they are precalibrated so as to compensate for any expected vehicular magnetism prior to delivery to the dealerships. The precalibration data used to calibrated the compass would, for example, correspond to average compensation data used for vehicles of a particular make and model.

There are, however, problems inherent in shipping precalibrated compasses to assembly plants for subsequent installation in a vehicle. In particular, the compass modules, which may otherwise be identical for each of the various makes and models, must be provided with the appropriate precalibration data for the make and model of the vehicle in which it is to be installed. Thus, the compass modules that are shipped must be separately designated for each make and model in which they are to be installed. This leads to inventory control problems at the assembly plants that manufacture more than one model vehicle. Further, vehicular magnetism can vary considerably from vehicle to vehicle even for vehicles of the same make and model. Such variance in magnetism may arise from various options included in these vehicles, such as larger fuel tanks, engines, or other options which a particular buyer may select. Given this variance in vehicular magnetism, a compass system that is precalibrated correctly for one vehicle may not be properly calibrated for another vehicle of the same model. Thus, absent some mechanism for calibrating such compass systems after installation or tightly controlling each vehicle's magnetic signature, there remains a likelihood that many precalibrated compass systems will not operate properly.

To reduce the extent of variability in vehicular magnetism from one vehicle to another, degaussers are utilized to attempt to provide nearly identical magnetic environments for each vehicle. Such degaussers are, however, expensive and difficult to implement and use effectively. Furthermore, effective degaussing requires the degausser to be brought as close as possible to the vehicle. However, various vehicle options make it very difficult to degauss each vehicle consistently. For example, pick-up trucks may have various different gross vehicle weight ratings. These ratings affect the truck's suspension, and consequently, the truck's build height. Thus, the task of controlling a vehicle's magnetic signature, which was difficult before, now becomes nearly impossible without an expensive moving degausser.

One approach used to attempt to solve some of the above-noted problems is to store precalibration data in the form of a proper pair of sensor readings that the compass sensors should output when the vehicle is headed in a predetermined direction if it were properly calibrated. Then, after the compass system has been installed in the vehicle, the vehicle is oriented in this predetermined direction while a precalibration routine is initiated. The precalibration routine compares the precalibration data to the actual sensor readings and computes the difference, which it subsequently uses as compensation offset data to correct all further actual readings obtained from the compass sensors. For example, the precalibration data may be the desired sensor readings when the vehicle is headed due north. Then, after the compass system has been installed and the vehicle is headed due north, the initiation of the precalibration routine informs the compass system that the vehicle is, in fact, due north such that a microprocessor in the compass system can compute the difference between the actual due north reading of the sensors with the desired due north reading to thereby calculate the compensation offset data.

The above approach requires that the compass precalibration data be consistent from part to part when calibrated in an identical field. Further, the magnetic field that is initially sensed during the initialization of the precalibration routine, must be of known and consistent strength. Additionally, the above approach requires that the initiation of the precalibration routine occur within a specific location within the assembly plant. If the location were ever to change or if the magnetic environment surrounding the specified location were to change, the precalibration data stored in the compasses would have to be changed thereby requiring the assembly plant to return to the OEM supplier any compasses not having the updated precalibration data. The above approach also fails to account for any predictable variations in each vehicle's construction that may affect the strength of the earth's magnetic field as sensed by the compass.

SUMMARY OF THE INVENTION

Accordingly, it is an aspect of the present invention to solve the above problems by providing a method of precalibrating a compass whereby the precalibration data is selected to correspond to the particular vehicle in which it is to be installed. Another aspect of the present invention is to provide a compass system in which precalibration data may be entered after the compass has been installed in the vehicle so as to account for predictable magnetic variations in each vehicle. An additional aspect of the invention is to provide an electronic compass in which precalibration data may be stored after the compass is received in an assembly plant so as to account for the specific location in the plant at which the compass is precalibrated.

To achieve these and other aspects and advantages, the method of installing a compass system according to the present invention comprises the steps of mounting the electronic compass in a vehicle, coupling the electronic compass to a power source of the vehicle, downloading precalibration data into the electronic compass after the electronic compass has been mounted in the vehicle, and initiating a precalibration routine in the vehicle that is headed in a predetermined direction. The precalibration data downloaded corresponds to a make and model of the vehicle in which the compass may be installed and further may correspond to sets of vehicle options that may affect vehicular magnetism. If the electronic compass is provided as part of a trip computer, the precalibration data is preferably downloaded at the same time that the fuel tank size is downloaded into the trip computer.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 4 is a flow chart illustrating the steps of the installation method of the trip computer according to the present invention.

DETAILED DESCRIPTION OF PREFERRED EMBODIMENT

Figure 2:
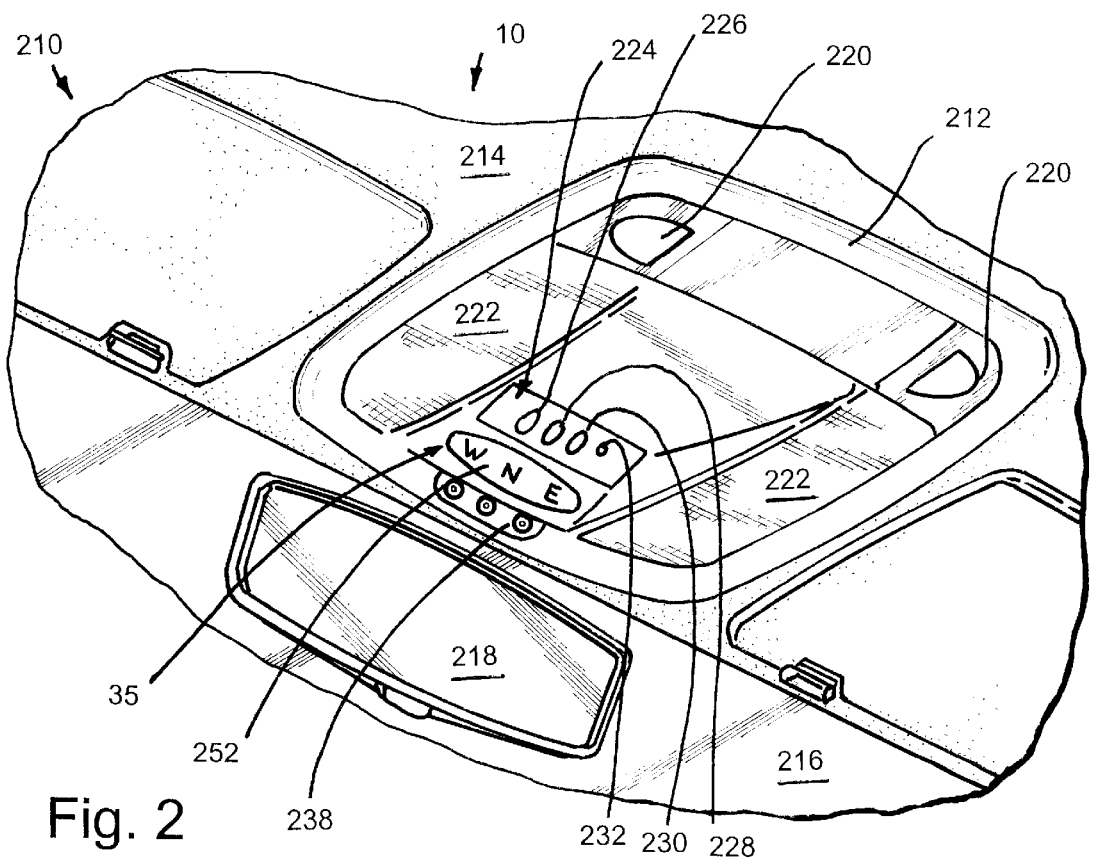
FIG. 2 is a fragmentary perspective view of a vehicle embodying the present invention.

FIG. 2 shows a vehicle 10 such as an automobile which includes an overhead console 212 mounted to the roof 214 of the vehicle during manufacture, although it could be separately added at a later time. Console 212 is centered near the top edge of windshield 216 typically above the rearview mirror 218 and includes a pair of switches 220 for operating lamps positioned behind lenses 222 which in turn direct illumination onto the lap area of either the driver or passenger side of the vehicle depending on which switch is actuated. The center of the console may include a trainable garage door opening transmitter 224 of the type disclosed in U.S. Pat. Nos. 5,614,891 and 5,661,804. This trainable transmitter can learn the RF frequency, modulation scheme, and security code of three or more existing remote transmitters. Thus, console 212 including trainable transmitter 224 can replace at least three separate remote control transmitters usually loosely stored in the vehicle. The transmitter includes three control switches 226, 228, and 230 and an indicator LED 232 for the display of training prompting information to the vehicle operator. Console 212 also includes a display panel 35, the center of which includes a digital display 252 providing in one embodiment of the invention, a 16-point compass display of the vehicle heading, as well as other information generated by a trip computer. Such other information may include distance to empty, fuel economy, average fuel economy, elapsed time, external temperature, and a tripometer. Console 212 also includes trip computer control switches 238 as well as the trip computer circuit shown in FIG. 3 which is appropriately mounted therein.

Figure 3:
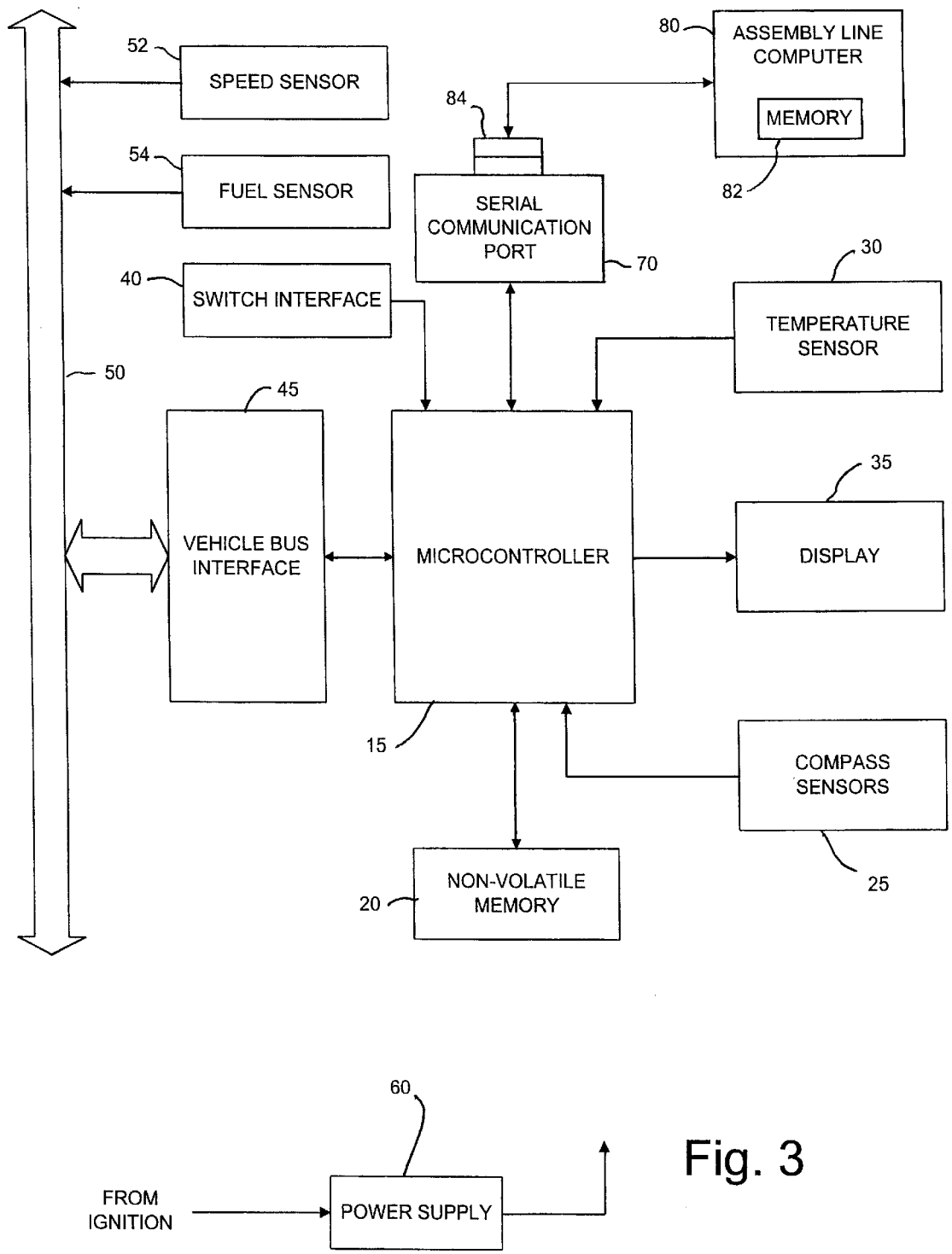
FIG. 3 is an electrical circuit diagram in block form of a trip computer constructed in accordance with the present invention.

The trip computer shown in FIG. 3 preferably includes a microcontroller 15 and a non-volatile memory 20 that is either connected to microcontroller 15 by an address line and a data line or included in the microcontroller chip itself for storing microcontroller instructions and other data. Additionally, the system includes compass sensors 25 coupled to an input port of microcontroller 15, display 35 including a display driver coupled to an output port of microcontroller 15, a temperature sensor 30 coupled to an input port of microcontroller 15, and a switch interface 40 providing a connection from various user-actuated switches 238 to an input port of microcontroller 15. The system may also include a vehicle bus interface chip 45 for providing the connection to the vehicle's bus 50. Also, the electronic system includes a power supply module 60 that is connected to the vehicle's ignition power line for supplying power to the various components of the trip computer while filtering transients from the ignition power line and protecting the system from such transients to isolate the system from any input noise, and to eliminate radiated output emissions.

By providing a connection to the vehicle bus 50, the trip computer is supplied with data from various engine components and other vehicle sensors such as a speed sensor 52, a fuel level sensor 54, and the like, connected to vehicle bus 50. For example, the trip computer may receive odometer data, fuel level data, fuel used data, and vehicle speed data. Such data may be used by microcontroller 10 to compute and display various trip information including distance to empty, fuel economy (miles per gallon), average fuel economy, exterior temperature (compensated for vehicle speed), and vehicle heading. By manipulation of switches 238 connected to switch interface 40, a user may cause microcontroller 15 to change display modes so as to step through the above-mentioned trip information as selected by the user.

Figure 1:
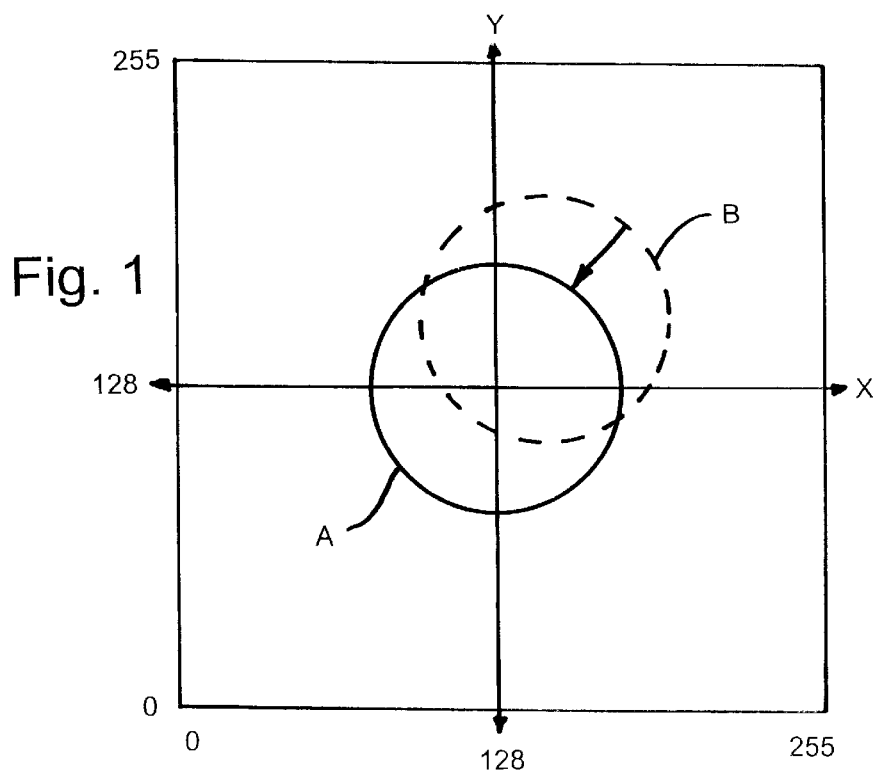
FIG. 1 is a graph illustrating the ideal signal representing the sensed magnetic field of the earth when the vehicle travels in a 360° loop, and the signal as sensed by a compass system in a vehicle having a different vehicular magnetism signature.

Trip computer systems having hardware such as that shown in FIG. 1, are generally known in the art. Such trip computers also typically include a serial communication port 70 that is used as a diagnostic link. This diagnostic link is utilized not only to retrieve diagnostic data from the trip computer, but also to input the fuel tank size of the vehicle into which the trip computer system has been installed such that the trip computer may properly compute the distance to empty information that is displayed to the vehicle occupants.

The trip computer shown in FIG. 3 differs from conventional trip computers, however, in that it does not have any compass precalibration data stored in non-volatile memory 20 when it is shipped to the assembly plant and installed in a vehicle, whereas the conventional trip computers and compass systems already have precalibration data stored in their memory if they are to be precalibrated. The method of installing the trip computer shown in FIG. 3 is described below with reference to FIG. 4.

As shown in FIG. 4, the process begins by mounting the trip computer module in a vehicle accessory, such as an overhead console, rearview mirror, or visor (step 101). The accessory is then mounted in the vehicle on the assembly line (step 103) while making any necessary connections to the vehicle's power supply or into the vehicle bus 50. At a subsequent station along the vehicle assembly line, a computer system 80 is provided to download information to the trip computer and its non-volatile memory 20 via serial communication port 70 and a serial connector 84. The computer system 80 at this station downloads compass precalibration data into the compass/trip computer (step 105). If the accessory is a trip computer, computer system 80 may also download the fuel tank size at that time. The precalibration data downloaded from the computer system 80 preferably identifies the direction the vehicle will be headed when the precalibration routine is initialized, as well as the expected magnetic field strength that will be sensed in the location of the plant where the precalibration routine is initialized. Such precalibration data may be in the form of the polar coordinates of a point on a circular plot of expected compass data.

Because the various computer systems provided in assembly plants may be programmed to download precalibration data specific to the assembly plant and/or assembly line where the computer system is located, variations in differing magnetic environments along the assembly lines at different plants may be accounted for. Further, the direction at which the vehicle is headed during precalibration may vary from plant to plant without requiring the OEM suppliers to account for variations by downloading different precalibration data in compass systems shipped to the different plants.

As an optional step in this procedure, computer system 80 may take into account the production schedule to identify the options on each vehicle passing the station. Computer system 80 may then identify those options and other characteristics of the vehicle that may affect vehicular magnetism, such as engine size, fuel tank size, body structure options (i.e., hatchback or trunk, regular, extended, or super cab options in a truck, etc.), as well as the model of the vehicle. Of specific concern are those structural vehicle characteristics that would cause the plot of compass data to appear more as an ellipse. Based upon the identified characteristics of the vehicle that is at the station at the time, the station computer selects from its memory 82 the appropriate compass precalibration data to correct for such predictable affects (i.e., selecting precalibration data that include polar coordinates for a heading 90° from the heading at which the precalibration routine is initialized) (step 107) and downloads this data to the trip computer via the serial communication port 70. This data is stored in nonvolatile memory 20 by microcontroller 15 for subsequent usage.

After this data has been downloaded to the trip computer, the vehicle subsequently traverses down the assembly line through several other assembly stations. Once all the vehicle components that may affect vehicular magnetism have been installed in the vehicle, the vehicle passes through a portion of the assembly plant where the compass precalibration routine is initialized (step 109). Ideally, this portion of the assembly plant will have the least amount of magnetic interference such that the earth's magnetic field may be sensed with little to no variation. Further, the vehicles should be headed in a predetermined direction along the assembly line when the precalibration routine is initialized. The precalibration routine may be initialized by manual activation of one of switches 238, or may be initialized automatically through the transmission of an appropriate signal through vehicle bus 50. By downloading the compass precalibration data into the trip computer after the trip computer has been installed within a vehicle, the precalibration data may be appropriately selected with respect to that particular vehicle and the particular plant where the precalibration routine is initialized. Thus, to the extent that the strength of the magnetic field that may be sensed by compass sensors mounted in that particular vehicle may be accounted for by selecting the appropriate precalibration data thereby more accurately precalibrating the compass.

Although the present invention has been described above with respect to a trip computer that functions as an electronic compass, the present invention may be employed to precalibrate stand-alone electronic compass systems so long as some means is provided that enables precalibration data to be downloaded to the compass after it has been installed in a vehicle.

It should be noted that the precalibration method of the present invention is preferably used to precalibrate compass systems that subsequently execute automatic calibration routines to continuously recalibrate. When used to precalibrate an automatically calibrating compass system, the compass system preferably transfers control from the precalibration routine to the automatic calibration routine in accordance with the method disclosed in U.S. Patent application Ser. No. 08/884,454 entitled "DUAL-CALIBRATED COMPASS" and filed on Jun. 27, 1997, the disclosure of which being incorporated herein by reference. The above description is considered that of the preferred embodiment only. Modifications of the invention will occur to those skilled in the art and to those who make or use the invention. Therefore, it is understood that the embodiment shown in the drawings and described above are merely for illustrative purposes and not intended to limit the scope of the invention, which is defined by the following claims as interpreted according to the principles of patent law, including the doctrine of equivalents.

The invention claimed is:

1. A method of installing an electronic compass in a vehicle comprising the steps of:

mounting the electronic compass in the vehicle;

coupling the electronic compass to a power source of the vehicle;

downloading precalibration data into the electronic compass after the electronic compass has been mounted in the vehicle; and initiating a precalibration routine when the vehicle is headed in a predetermined direction.

2. The method as defined in claim 1 and further including the steps of:

prestoring a plurality of sets of precalibration data, each set corresponding to a make and model of vehicle in which the electronic compass may be installed;

identifying the characteristics of the vehicle; and selecting precalibration data corresponding to the identified vehicle characteristics from the plurality of prestored sets of precalibration data.

3. The method as defined in claim 2, wherein the step of identifying characteristics of the vehicle includes identifying the make and model of the vehicle and identifying any options that may effect vehicle magnetism.

4. The method as defined in claim 1 and further including the step of prestoring a plurality of sets of precalibration data, each set corresponding to a make and model of vehicle in which the electronic compass may be installed and corresponding to a set of vehicle options that may effect vehicular magnetism.

5. The method as defined in claim 1, wherein the precalibration data includes data representing compass sensor output levels for a properly calibrated compass mounted in a vehicle having similar characteristics and headed in the predetermined direction.

6. The method as defined in claim 5, wherein the precalibration routine includes the substeps of reading the compass sensors when the vehicle is headed in the predetermined direction, comparing the read sensor output levels to the sensor output levels represented in the precalibration data, and storing any difference between the read sensor output levels to the sensor output levels represented in the precalibration data as sensor compensation data for subsequent use by the electronic compass when computing the vehicle's heading.

7. The method as defined in claim 1, wherein the step of mounting the electronic compass in the vehicle includes mounting the electronic compass in a vehicle accessory and mounting the accessory to the vehicle.

8. The method as defined in claim 7, wherein the vehicle accessory is an overhead console.

9. A method of installing a trip computer in a vehicle, the trip computer including electronic compass sensors and a processor coupled to the compass sensors and having a serial communication port, the method comprising the steps of:

mounting the trip computer in the vehicle;

coupling the trip computer to a power source of the vehicle;

downloading the vehicle's fuel tank size and compass precalibration data into the trip computer after the trip computer has been mounted in the vehicle; and initiating a compass precalibration routine when the vehicle is headed in a predetermined direction.

10. The method as defined in claim 9 and further including the steps of:

prestoring a plurality of sets of compass precalibration data, each set corresponding to a make and model of vehicle in which the trip computer may be installed;

identifying characteristics of the vehicle; and selecting compass precalibration data corresponding to the identified vehicle characteristics from the plurality of prestored sets of compass precalibration data.

11. The method as defined in claim 10, wherein the step of identifying characteristics of the vehicle includes identifying the make and model of the vehicle and identifying any options that may effect vehicle magnetism.

12. The method as defined in claim 9 and further including the step of prestoring a plurality of sets of compass precalibration data, each set corresponding to a make and model of vehicle in which the trip computer may be installed and corresponding to a set of vehicle options that may effect vehicular magnetism.

13. The method as defined in claim 9, wherein the precalibration data includes data representing compass sensor output levels for a properly calibrated compass mounted in a vehicle having similar characteristics and headed in the predetermined direction.

14. The method as defined in claim 13, wherein the compass precalibration routine includes the substeps of reading the compass sensors when the vehicle is headed in the predetermined direction, comparing the read sensor output levels to the sensor output levels represented in the compass precalibration data, and storing any difference between the read sensor output levels to the sensor output levels represented in the compass precalibration data as sensor compensation data for subsequent use by the processor when computing the vehicle's heading.

15. The method as defined in claim 9, wherein the step of mounting the trip computer in the vehicle includes mounting the trip computer in a vehicle accessory and mounting the accessory to the vehicle.

16. The method as defined in claim 15, wherein the vehicle accessory is an overhead console.

17. An electronic compass for a vehicle comprising:

a magnetic field sensor for detecting the earth's magnetic field and for providing electrical signals representing the direction of the vehicle in relation to the earth's magnetic field;

a heading indicator for indicating vehicle headings in response to received vehicle heading signals;

data receiving means for receiving precalibration data from an external source after the compass has been installed in the vehicle; and a processor coupled to said magnetic field sensor for receiving said electrical signals, coupled to said heading indicator for supplying the vehicle heading signals to said heading indicator, and coupled to said data receiving means for receiving the precalibration data, said processor calculates vehicle headings in response to said received electrical signals using the precalibration data to compensate for vehicular magnetism.

18. The electronic compass as defined in claim 17, wherein said heading indicator is a display.

19. In a combination of a vehicle-installed electronic compass system and an assembly line computer system used to download precalibration data into the electronic compass system, the electronic compass system subcombination comprising:

a magnetic field sensor for detecting the earth's magnetic field and for providing electrical signals representing the direction of the vehicle in relation to the earth's magnetic field;

a heading indicator for indicating vehicle headings in response to received vehicle heading signals;

data receiving means for receiving the precalibration data from the assembly line computer system after the electronic compass system has been installed in the vehicle; and a processor coupled to said magnetic field sensor for receiving said electrical signals, coupled to said heading indicator for supplying the vehicle heading signals to said heading indicator, and coupled to said data receiving means for receiving the precalibration data, said processor calculates vehicle headings in response to said received electrical signals using the precalibration data to compensate for vehicular magnetism.

20. The electronic compass system as defined in claim 19, wherein said heading indicator is a display.

* * * * *